(12) United States Patent
Tickner

(10) Patent No.: US 12,228,530 B2
(45) Date of Patent: Feb. 18, 2025

(54) METHOD FOR MOISTURE MEASUREMENT

(71) Applicant: Chrysos Corporation Limited, Urrbrae (AU)

(72) Inventor: James Tickner, Urrbrae (AU)

(73) Assignee: Chrysos Corporation Limited, Urrbrae (AU)

( * ) Notice: Subject to any disclaimer, the term of this patent is extended or adjusted under 35 U.S.C. 154(b) by 870 days.

(21) Appl. No.: 17/251,885

(22) PCT Filed: Jun. 13, 2019

(86) PCT No.: PCT/AU2019/050609
§ 371 (c)(1),
(2) Date: Dec. 14, 2020

(87) PCT Pub. No.: WO2019/241830
PCT Pub. Date: Dec. 26, 2019

(65) Prior Publication Data
US 2021/0255120 A1  Aug. 19, 2021

(30) Foreign Application Priority Data

Jun. 21, 2018 (AU) ............... 2018902220

(51) Int. Cl.
*G01N 23/222* (2006.01)
(52) U.S. Cl.
CPC ... *G01N 23/222* (2013.01); *G01N 2223/0745* (2013.01); *G01N 2223/1063* (2013.01);
(Continued)
(58) Field of Classification Search
CPC ......... G01N 23/222; G01N 2223/0745; G01N 2223/1063; G01N 2223/1066; G01N 2223/613
See application file for complete search history.

(56) References Cited

U.S. PATENT DOCUMENTS

| 4,171,485 A | 10/1979 | Marshall |
| 6,825,459 B2 | 11/2004 | Bothner |
| 2009/0225922 A1* | 9/2009 | Koltick ............ H05H 3/06 376/158 |

FOREIGN PATENT DOCUMENTS

| CN | 1773267 A | 5/2006 |
| IN | 101004392 A | 7/2007 |

(Continued)

OTHER PUBLICATIONS

International Search Report and Written Opinion for corresponding International application No. PCT/AU2019/050609; dated Jul. 18, 2019 (11 pages).

(Continued)

*Primary Examiner* — Jack W Keith
*Assistant Examiner* — Daniel Wasil
(74) *Attorney, Agent, or Firm* — Mendelsohn Dunleavy, PC

(57) ABSTRACT

Moisture content in a sample material undergoing elemental activation analysis (EAA) is determined. The sample material contains a sample element which during EAA forms an activation product. A reference material, distinct from the sample element, is positioned in vicinity of the sample material. The reference material contains a reference element having a thermal neutron capture cross-section. The reference material is selected such that its product isotope of a thermal neutron capture reaction is a radioisotope that emits gamma-rays. The sample material and the reference material are irradiated with a source of fast neutrons to produce thermal neutrons in the sample material. Signals are generated representative of detected gamma-rays emitted from the reference material. A factor, R, proportional to the thermal neutron flux, is calculated based on the generated (Continued)

signals. From a relationship relating moisture content to R, the moisture content in the sample material is determined.

20 Claims, 3 Drawing Sheets

(52) U.S. Cl.
CPC .............. *G01N 2223/1066* (2013.01); *G01N 2223/613* (2013.01)

(56) References Cited

FOREIGN PATENT DOCUMENTS

| | | | |
|---|---|---|---|
| JP | S59-77346 | A | 5/1984 |
| RU | 2582901 | C1 * | 4/2016 |
| SU | 542406 | A1 | 12/1988 |
| SU | 749203 | A1 | 12/1988 |
| SU | 1755142 | A1 | 8/1992 |

OTHER PUBLICATIONS

Extended European Search Report for corresponding European application No. 19822387.7; dated Jul. 2, 2021 (8 pages).

Greenberg, Robert R., et al. "Neutron activation analysis: A primary method of measurement." Spectrochimica Acta Part B: Atomic Spectroscopy 66.3-4 (2011): 193-241.

Reeder, P. L., et al. "Moisture measurement for radioactive wastes using neutron activation of copper." Applied Radiation and Isotopes 48.2 (1997): 247-256.

* cited by examiner

METHOD FOR MOISTURE MEASUREMENT

TECHNICAL FIELD

The present application claims priority from PCT Application No. PCT/AU2019/050609, which itself claims priority from Australian Provisional Patent Application No 2018902220 filed on 21 Jun. 2018, the content of both of which is incorporated herein by reference.

The present disclosure relates to a method and a system for determining the thermal neutron flux in a sample material undergoing elemental activation analysis, and more particularly for determining the moisture content in the sample material.

BACKGROUND

Gamma activation analysis (GAA), also known as photon activation analysis, is a non-destructive analytical technique for elemental determination in materials such as mineral samples. Briefly, a sample is exposed to the activating radiation (for instance a high-power electron linear accelerator-based X-ray source) whereby nuclear reactions are induced in the different elements in the sample. The resulting decays of any radioisotopes generated in these reactions give rise to characteristic gamma rays that can be identified to indicate the presence of particular elements, or compared to standard samples for quantitative analysis.

The elemental composition of the mineral sample is routinely reported on a dry-basis to provide an accurate estimate of the grades of important elements independent of the water content of the sample. Accordingly, this necessitates a preliminary step of drying the sample to eliminate any moisture content, or else measuring the quantity of moisture in the sample.

In dense materials it is desirable to employ the technique of neutron thermalisation when measuring the quantity of moisture in a sample since neutrons are highly penetrating, and thereby afford a measurement of the average water content of a bulk material. Energetic or fast neutrons rapidly lose energy in collisions with hydrogen atoms which are an important constituent of water. Measurement of the degree to which fast neutrons emitted by a source are reduced in energy by collisions inside the sample provides an indication of the hydrogen content of the sample, which can in turn be related to the water content. This necessitates the use of a neutron source and an electronic neutron detector.

Any discussion of documents, acts, materials, devices, articles and the like in this specification is included solely for the purpose of providing a context for the present invention. It is not suggested or represented that any of these matters formed part of the prior art base or were common general knowledge in the field relevant to the present invention as it existed in Australia or elsewhere before the priority date of each claim of this application.

It is to be understood that, throughout the description and claims of the specification, the word "comprise" and variations of the word, such as "comprising" and "comprises", is not intended to exclude other additives, components, integers or steps.

SUMMARY

A method is provided for determining the moisture content in a sample material undergoing elemental activation analysis (EAA), the sample material containing at least one sample element which during EAA forms an activation product, the method comprising:
positioning a reference material in the vicinity of the sample material, the reference material containing a reference element having a thermal neutron capture cross-section of at least 1 barn, the reference material selected such that its product isotope of a thermal neutron capture reaction is a radioisotope that emits gamma-rays;
irradiating the sample material and the reference material radiation with a source of fast neutrons to produce thermal neutrons in the sample material;
detecting gamma-rays emitted from the reference material and generating signals representative of the detected gamma-rays;
calculating a factor, R, proportional to the thermal neutron flux based on the generated signals; and
identifying, from a relationship relating moisture content to R, the moisture content in the sample material.

In an embodiment, the relationship may be an empirical relationship, and the method may further comprise determining the empirical relationship relating moisture content to R by calculating R for a plurality of sample materials.

In an embodiment where the method is used in conjunction with fast-neutron activation analysis, the neutron source used for the activation also serves as the source of fast neutrons for the thermalisation measurement.

In an embodiment where the method is used in conjunction with photon activation analysis performed using Bremsstrahlung X-rays, photoneutrons produced in the Bremsstrahlung conversion target act as the source of fast neutrons.

In a first embodiment, the reference element in the reference material is selected such that the product formed by neutron capture is an unstable isotope with a half-life similar to the half-life of the activation product of the sample element. Optionally, the reference element in the reference material may be selected such that the product formed by neutron capture is an unstable isotope with a half-life in the range of 1 s to 10 min, or more preferably in the range of 3 s to 1 min.

In the first embodiment, the reference element in the reference material is preferably further selected such that the gamma-rays emitted by the unstable isotope have an energy which do not interfere with the gamma-rays emitted by the at least one sample element in the sample material.

In the first embodiment, the reference element in the reference material is preferably further selected such that it is either distinct from sample elements in the sample material, or if it is present in the sample material its concentration is insignificant. In this instance, preferably the mass of the reference element present in the sample material is less than 2% of the mass of the reference element in the reference material. More preferably, the mass of the reference element present in the sample material is less than 0.5% of the mass of the reference element in the reference material.

In the first or a second embodiment, the reference element in the reference material is selected such that the natural abundance of the target isotope participating in the neutron capture reaction is greater than 1%.

The factor, R, proportional to the thermal neutron flux may be calculated by:
counting the generated signals over a period of time ($t_m$);
determining a measured area of the gamma-peak associated with the reference element ($N_{y1}$;
determining a timing factor $T_1$, where $$T_1 = \frac{1}{r_1}\left(1 - e^{(-r_1 t_i)}\right) \cdot \left(e^{(-r_1 t_c)}\right) \cdot \left(1 - e^{(-r_1 t_m)}\right);$$

and
calculating R, where $$R = \frac{N_{\gamma 1}}{T_1},$$

where $t_i$ and $t_c$ are respectively the irradiation and cooling measurement times used for the elemental activation analysis.

In any embodiment, the quantity of the reference element is selected to produce a gamma-ray spectral peak of at least 1,000 counts, and preferably more than 4,000 counts, under the operating conditions used to measure the sample element.

In one embodiment, the reference element selected is scandium. In another embodiment the reference element selected is scandium and the sample element selected is one of gold and silver.

In any embodiment, the reference material may contain a second reference element selected such that its product isotope of a reaction with the primary radiation beam emitted by the source is a radioisotope that emits gamma-rays having a different energy from the gamma-rays emitted by the radioisotope associated with the first reference element.

In such an embodiment, the second reference element is preferably selected such that the product isotope associated with the second element has a half-life substantially similar to the product isotope associated with the first reference element. The second reference element is preferably further selected such that the gamma-rays emitted by its unstable isotope have an energy which do not interfere with the gamma-rays emitted by the at least one element in the sample element.

In one specific embodiment where the method involves using a second reference element, the source emits high-energy X-rays, the sample element selected is gold or silver, the reference element selected is scandium, the second reference element selected is bromine and the second reference reaction is formation of the $^{79}$Br meta-state via the inelastic photon scattering.

The step of irradiating the sample material and the reference material radiation with a source of fast neutrons, and the step of measuring the irradiated sample material and reference material proceed for a predetermined period of time to allow the concentrations of element(s) in the sample material to be measured to a desired level of precision.

A system is provided for determining the moisture content in a sample material undergoing elemental activation analysis (EAA), the sample material containing at least one sample element which during EAA forms an activation product, the system comprising:
  a source of fast neutrons configured to irradiate the sample material and a reference material to produce thermal neutrons in the sample material, the reference material positioned in vicinity of the sample material, the reference material containing a reference element having a thermal neutron capture cross-section of at least 1 barn, the reference material selected such that its product isotope of a thermal neutron capture reaction is a radioisotope that emits gamma-rays;
  a detector and measurement station that is physically separate from the source of fast neutrons, the detector and measurement station comprising:
    at least a first detector configured to (i) detect gamma-rays emitted from the reference material, and (ii) to generate a signal representative of the detected gamma-rays; and
    a processor coupled to the detector and configured to calculate a factor, R, proportional to the thermal neutron flux based on the generated signals and to identify, from a relationship relating moisture content to R, the moisture content in the sample material.

In an embodiment where the system is additionally employed to perform fast-neutron activation analysis, the neutron source used for the activation also serves as the source of fast neutrons for the thermalisation measurement.

In an embodiment where the system is additionally employed to perform photon activation analysis using Bremsstrahlung X-rays, photoneutrons produced in the Bremsstrahlung conversion target act as the source of fast neutrons. In such an embodiment, the energies of the photoneutrons produced via Bremsstrahlung typically range from a few keV to a few MeV.

The relationship may be an empirical relationship, and the processor may be further configured to determine the empirical relationship relating moisture content to R by calculating R for a plurality of sample materials.

The source of fast neutrons may be a neutron-emitting isotopic source, a sealed-tube neutron generator, a particle accelerator, or an X-ray source producing photo-neutrons. The fast neutron source may be a D-D neutron generator which produces neutrons with an energy of about 2.45 MeV, or a D-T neutron generator which produces neutrons with an energy of about 14 MeV.

It should be appreciated that the detector, or detectors, will be any suitable detector capable of distinguishing gamma rays emitted from the reference material and the sample material. For instance the detector may be an energy resolving detector such as a CdTe detector or an HPGe detector.

In a first embodiment, the reference element in the reference material is preferably selected such that the product formed by neutron capture is an unstable isotope with a half-life similar to the half-life of the activation product of the sample element. In one example the product formed by neutron capture is an unstable isotope with a half-life in the range of 1 s to 10 min and more preferably in the range of 3 s to 1 min.

In the first embodiment, the reference element in the reference material is preferably selected such that the gamma-rays emitted by the unstable isotope have an energy which do not interfere with the gamma-rays emitted by the at least one sample element in the sample.

In the first embodiment, the reference element in the reference material is either distinct from elements in the sample material, or if it is present in the sample material, its concentration is insignificant. In this latter instance, the mass of the reference element present in the sample material is preferably less than 2% of the mass of the reference element in the reference material. More preferably, the mass of the reference element present in the sample material is less than 0.5% of the mass of the reference element in the reference material.

In the first or a second embodiment, the reference element in the reference material is selected such that the natural abundance of the target isotope participating in the neutron capture reaction is greater than 1%. Optionally, isotopic enrichment may be used to increase the abundance of the target isotope above its naturally occurring level.

In the first or a second embodiment, the reference element in the reference material is selected such that it is not prone to an interfering reaction, where the activation product can be formed from competing reactions with other naturally occurring isotopes of the reference element.

In most, though not all applications, the sample material is in a powder, granular or slurry form. In such applications, the sample container is a sealed container.

BRIEF DESCRIPTION OF THE DRAWINGS

In order that the present invention may be more clearly ascertained, embodiments will now be described, by way of example, with reference to the accompanying drawings in which.

DETAILED DESCRIPTION

Figure 1:
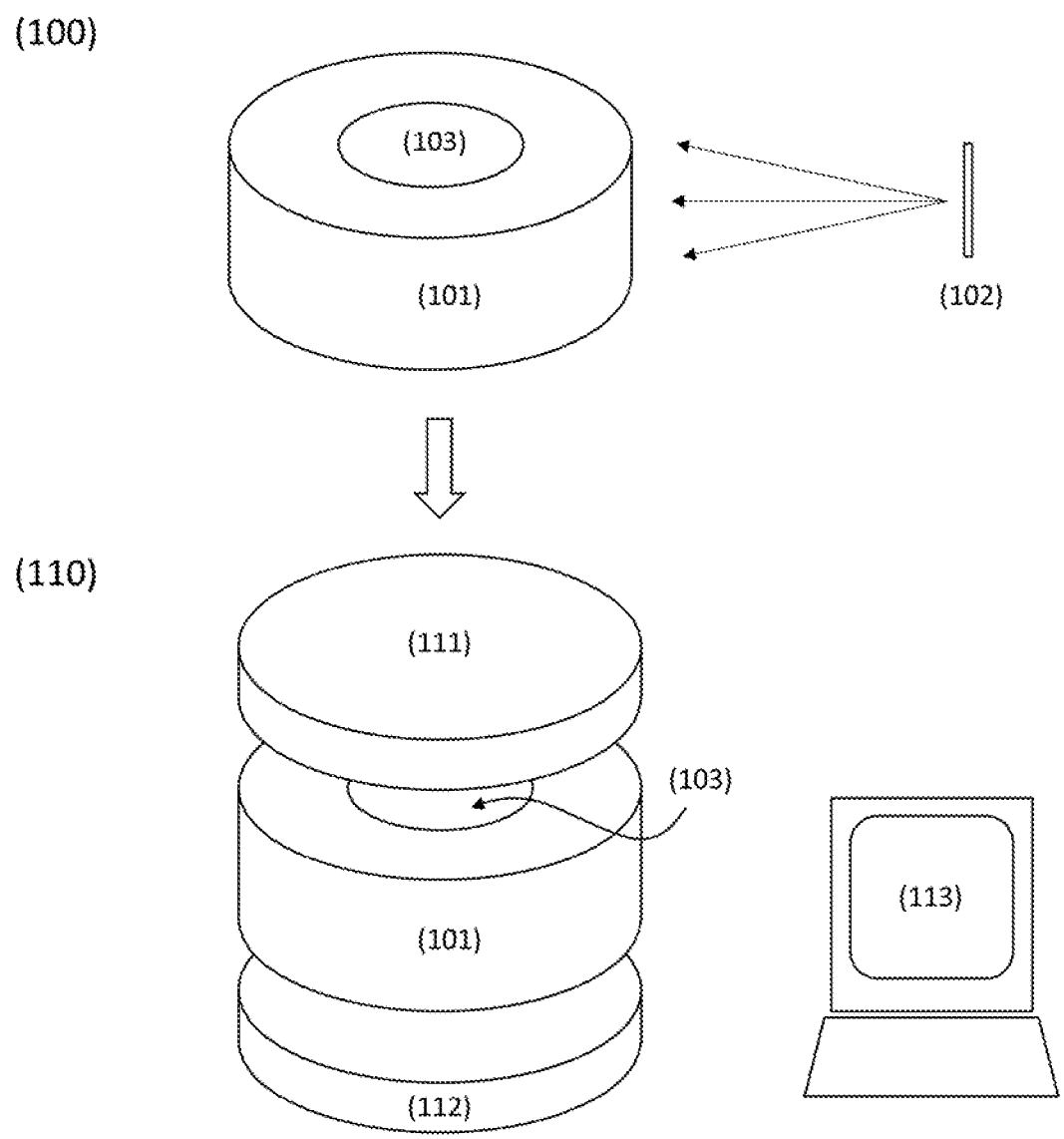
FIG. 1 is a schematic illustration of an apparatus in accordance with an embodiment of the invention.

With reference to FIG. 1, there is shown an apparatus for determining the moisture measurement in a sample material which is a mineral sample. The apparatus includes an irradiation station 100 and a detector/measurement station 110. The irradiation station 100 includes a sealed cylindrical sample container 101 configured to hold a sample material in powdered, granular or slurry form, whose elemental composition and level of moisture are to be determined. The sample container 101 is preferably formed from a plastic material which is free from any interfering elements. Reference material 103 in the form of a disc, is formed of a metal carrier (magnesium) which contains within it, the reference element which is sensitive to thermal neutrons. The reference element is contained in the carrier in a convenient form. If the reference element is scandium then the metal carrier may have the reference element in the form of $Sc_2O_3$. The reference disc is removably attached to an outer surface of the sample container 101. In the illustrated embodiment, the reference disc 103 is situated in a recessed portion of the cylindrical sample container 101. This is preferable to avoid contamination. The sample container 101 has a recess in its top which has sufficient dimensions to accommodate reference disc 103.

The irradiation station 100 further includes a radiation source 102 configured to emit radiation into the sample container 101 containing the reference material, and a transport system (not shown) to insert and retain the sample container 101 in position relative to the radiation source 102 and to remove the sample container 101 when irradiation thereof is complete. Radiation shielding (not shown) is provided to protect both operators and the detector and measurement station when the radiation source 102 is in use.

The detector and measurement station 110, which is apart from the radiation source, includes at least one, and preferably two or more gamma-ray detectors 111, 112 disposed around the sample container 101. Each of the gamma-ray detectors 111, 112 are configured to detect radiation from the sample material and/or the reference material, and to generate signals representative of the detected radiation. Each of the detectors 111, 112 are circular in cross section and are respectively positioned above and below the sample container 101 to not only count a larger fraction of the gamma-rays emitted from the sample but to also improve measurement uniformity of the sample element. Furthermore, and in order to distinguish different signals emanating from the sample element and the reference element(s) on the basis of their energy, each of the gamma-ray detectors 111, 112 are energy dispersive detectors. The detector and measurement station 110 further includes a processing system 113 to process the signals representative of the detected radiation to determine the sample's moisture content and concentration of the at least one sample element.

Preferred Criteria for Selection of a Suitable Reference Element

The criteria for the selection of a suitable reference element for the thermal neutron flux measurement are as follows:

first, the element in the reference disc should not be expected to be present at significant concentrations in the sample material to be measured;

second, one or more isotopes in the element of the reference disc should have a high thermal neutron capture cross-section, in the order of at least 1 barn or at least $10^{-24}$ cm$^2$.

third, the product of the neutron capture reaction should be an unstable isotope with a convenient half-life, ideally in the range of 1 second to 10 minutes, and more ideally in the range of 3 seconds to 1 minute;

fourth, the unstable isotope product formed in the neutron capture reaction should strongly emit one or more gamma-rays; and the energies of the gamma-rays emitted by the unstable isotope should not interfere with the measurement of gamma-rays emitted by elements activated in the sample material.

According to these requirements, a portion of the thermal neutrons produced in the sample material will be captured by the reference element in the reference disc. This will lead to the formation of an unstable radioisotope in the reference disc at a level proportional to the flux of thermal neutrons.

TABLE 1

Thermal neutron activation cross-sections and decay properties for potential reference disc elements.

| Target | Prop (%) | $\sigma_C$ (b) | Product | $t_{1/2}$ | Intf. | Principle emission gamma-rays (keV) |
|---|---|---|---|---|---|---|
| $^{176}$Hf | 5.26 | 26 | $^{177m}$Hf | 1.09 s | Yes | X-rays + many gamma-rays up to 466 |
| $^{166}$Er | 33.5 | 15 | $^{167m}$Er | 2.27 s | Yes | 48.2(5.37%) 49.1(9.44%) 55.5(1.01%) 55.7(1.94%) 207.8(42.4%) |

TABLE 1-continued

Thermal neutron activation cross-sections and decay properties for potential reference disc elements.

| Target | Prop (%) | $\sigma_C$ (b) | Product | $t_{1/2}$ | | Intf. | Principle emission gamma-rays (keV) |
|---|---|---|---|---|---|---|---|
| $^{182}$W | 26.5 | 20.7 | $^{183m}$W | 5.20 | s | Yes | X-rays + 99.1(8.14%) 102.5(2.42%) 107.9(18.9%) 160.5(5.12%) |
| $^{176}$Yb | 13.00 | 3 | $^{177m}$Yb | 6.41 | s | | X-rays + 104.5(76.5%) 227.0(12.6%) |
| $^{80}$Kr | 2.286 | 4.6 | $^{81m}$Kr | 13.10 | s | | 190.5(67.7%) |
| $^{115}$In | 95.71 | 202 | $^{116}$In | 14.10 | s | | 1293.4(1.30%) |
| $^{76}$Se | 9.37 | 21 | $^{77m}$Se | 17.36 | s | Yes | 161.9(53.2%) |
| $^{178}$Hf | 27.28 | 50 | $^{179m}$Hf | 18.67 | s | Yes | X-rays + 160.7(2.88%) 214.3(95.3%) |
| $^{45}$Sc | 100.0 | 10 | $^{46m}$Sc | 18.75 | s | | 142.5(62.0%) |
| $^{109}$Ag | 48.16 | 91 | $^{110}$Ag | 24.56 | s | | 657.5(4.50%) |
| $^{103}$Rh | 100.0 | 134 | $^{104}$Rh | 42.30 | s | | 555.8(2.00%) |
| $^{164}$Dy | 28.26 | 1700 | $^{165m}$Dy | 1.26 | min | | X-rays + 108.2(3.01%) 515.5(1.53%) |
| $^{107}$Ag | 51.84 | 37.6 | $^{108}$Ag | 2.38 | min | | 633.0(1.76%) |
| $^{51}$V | 99.75 | 4.9 | $^{52}$V | 3.74 | min | | 1434.1(100.0%) |
| $^{103}$Rh | 100.0 | 11 | $^{104m}$Rh | 4.34 | min | | 51.4(48.3%) 77.5(2.08%) 97.1(2.99%) |
| $^{65}$Cu | 30.85 | 2.17 | $^{66}$Cu | 5.12 | min | | 1039.2(9.23%) |

Table 1 lists the elements in the periodic table that have a thermal neutron capture cross-section of at least 1 barn for an isotope having a natural abundance of at least 1%, where the capture reaction gives rise to a product having a half-life in the range 1 second to 10 minutes, said product emitting at least one gamma-ray with an energy above 40 keV with an emission probability of 1% or more.

The column titled 'Target' refers to the potential reference disc element and specific isotope that undergoes activation via neutron capture. The column titled 'Prop (%)' refers to the natural abundance of the corresponding isotope in the Target column. The column titled "Product' refers to the product isotope of the neutron capture reaction. Note that the Product may be in either the ground state or a meta-state, the latter denoted by a superscript 'm'. The column titled '$\sigma_c$(b)' refers to the thermal neutron capture cross-section, measured in barns, for this isotope leading to formation of the stated 'Product'. The column titled $t_{1/2}$ refers to the Product's half-life. The column titled 'Intl' indicates whether competing inelastic scattering reactions can also give rise to the product isotope. Last, the column titled 'Principle emission gamma-rays' specifies the energies and intensities (%) of the main X-ray or gamma-ray emitted from the product isotope.

The choice of the most suitable reference element will depend on the concentrations and decay properties of the other elements in the sample material that are to be measured using activation analysis. Ideally the reference element will have a similar half-life to the activation products being measured and will produce gamma-rays of a convenient energy that do not interfere with the activation product gamma-rays. Further, the reference element should not be expected to be present in the samples being measured at significant concentrations. The mass of the reference element present in the sample should be less than 2% of the mass of the reference element in the reference disc. Preferably, the mass of the reference element present in the sample should be less than 0.5% of the mass of the reference element in the reference disc.

Another factor influencing the choice of reference element is an absence of interfering reactions. Two types of interfering reactions need to be considered. The first involves production of the target isotope in the reference elements via inelastic scattering of fast source neutrons or photons. For example, the $^{77m}$Se product formed via neutron capture by $^{76}$Se can also be formed via the $^{77}$Se(g,g')$^{77m}$Se or $^{77}$Se(n,n')$^{77m}$Se reactions on naturally occurring $^{77}$Se. The occurrence of such reactions excludes the potential reference element from further consideration, as it is impossible to distinguish whether the product isotope is formed via inelastic scattering or thermal neutron capture.

The second type of interfering reaction is the formation of unwanted radioactive products via (g,g'), (n,n'), (g,n) or (n,g) reactions on the target isotope or other naturally occurring isotopes in the reference element. If these reactions have unfavourable decay properties, they can adversely affect the measurement of the desired decay products of both the reference element and elements being analysed in the sample. Reference elements where the target isotope constitutes 100% or close to 100% of the natural isotopic abundance are preferred to avoid or minimise this class of interference reactions.

Two examples are provided to illustrate the selection of an optimal reference element for a given application. The first example involves the analysis of gold via gamma activation analysis (inelastic photon scattering). The $^{197}$Au(g,g') $^{197m}$Au reaction produces the isomeric state of gold-197, which has a half-life of 7.73 seconds and decays to produce a gamma-ray having an energy of 279 keV. In commercial applications, gold is present at low concentrations and hence it is important that the gamma-rays emitted by the reference element should have energies below 279 keV to avoid potential interference.

Considering the elements in Table 1 with half-lives similar to that of the gold isomer (7.73 s), the ideal choice for the reference element is scandium (Sc). Se and Hf are excluded due to presence of interfering reactions; In and Ag produce gamma-rays with energies above 279 keV; and Yb has significant interfering reactions. Krypton-80 (Kr) is not preferred due to its low isotopic abundance and the difficulty of working with a gaseous reference element.

The second example involves the analysis of copper via the reaction $^{63}$Cu(g,n)$^{62}$Cu. The copper-62 product has a half-life of 9.67 min and decays to produce gamma-rays with energies of 511 keV. In commercial applications, copper can be present at significant concentrations and generates a strong gamma-ray signature. It is then preferred to have the reference disc emit a gamma-ray with an energy above 511 keV to minimise interference with the copper signal. For this example, the preferred reference disc elements are either rhodium (Rh) or vanadium (V).

It will be appreciated that analysis of other elements in a mineral sample may require the selection of other reference elements. For example, if the activation products of the elements in the sample material being measured have half-lives significantly longer than the activation products of gold or copper, then it will be necessary to use a reference element with a similarly length half-life. Tabulations of elemental abundances, thermal neutron capture cross-sections, half-lives and emission gamma-rays are readily available to facilitate this selection.

The quantity of the reference element used in the reference disc is selected to ensure that the gamma-ray signal measured in the detector system is of sufficient amplitude to allow it to be measured with good statistical precision. Preferably, the quantity of the reference element used should produce a gamma-ray spectral peak containing at least 1,000 counts. More preferably, the gamma-ray spectral peak from the reference element should contain at least 4,000 counts. The quality of the reference element may be straightforwardly determined by performing a test using a known quantity of the reference element, for example 1 g. As the detected gamma-ray peak area is proportional to the mass of reference element used, the quantity may be readily adjusted to produce a peak of the desired intensity based on this test.

For example, in the case that elements in mineral ore samples are being measured via gamma activation analysis using an 8 kW electron accelerator operating at 8.5 MeV, a suitable quantity of scandium to use in a reference disc is between 1 and 3 grams, which results in a peak area of 2000-6000 counts for a dry sample.

Additionally, the reference disc may contain a second reference element that undergoes a reaction with the primary radiation beam emitted by the source to produce a radioisotope product that emits a gamma-ray having a different energy from the gamma-ray emitted by the first reference element. The second reference element should be chosen to have a similar half-life to the first reference element, and should be expected not to be present in the samples being assayed at an appreciable concentration. Further, the second reference element should be chosen so that its product does not interfere with the analysis of elements in the sample being measured.

The second reference element may be used to monitor any variations in the output of the radiation source, that would otherwise give rise to variations in the peak intensity of the gamma-rays measured from the first reference element. Conveniently, the ratio R:

$$R = \frac{N_{\gamma 1}}{N_{\gamma 2}}, \frac{T_2}{T_1} \quad \text{Equation (1)}$$

may be calculated where $N_{\gamma 1/c}$ is the measured area of the gamma-ray peak associated with the first or second reference element $T_{1/c}$ is a timing factor given by:

$$T_{1,2} = \frac{1}{r_{1,2}}(1 - \exp(-r_{1,2}t_1)) \cdot \exp(-r_{1,2}t_c) \cdot (1 - \exp(-r_{1,2}t_m)) \quad \text{Equation (2)}$$

where $r_{1,c} = \ln(2)/\text{thalf}_{1,c}$ the decay rate of the product of the first or second reference element and $t_i$, $t_c$ and $t_m$ are respectively the irradiation, cooling and measurement times used for the activation analysis.

The ratio R provides a measure proportional to the thermal neutron flux in the vicinity of the sample, corrected for any variation in the output of the radiation source.

Empirically, the relationship between R and the sample moisture content (wt %) is observed to have the approximate form:

$$\frac{R(w)}{R(0)} = a\,\exp(-bw) \quad \text{Equation (3)}$$

where R(Q) is the value of R measured for a dry sample and a and b are empirically determined constants.

For sample materials of a similar type, the value of R(0) is approximately constant. The values of R(0) and the parameters a and b can be determined by measuring the values of R for a number of samples of different composition and moisture content.

Methodology

In operation, the reference element is determined and a reference disc 103 formed at least in part from the reference element is fabricated. Thereafter, the powdered sample material is loaded into the sample container. A robot positions the sample container 101 in relationship to the reference disc 103. The sample container and reference disc 103 then move as one into vicinity of the radiation source 102. The radiation source 102 is operated for a period of time to emit radiation into the sample material in order to induce activation of the elements inside the sample material.

If the activation method is fast-neutron activation analysis (FNAA), then high-energy neutrons emitted from the source will be thermalised inside the sample material in close relation to the sample's hydrogen content.

If the activation method is gamma activation analysis (GAA), also known as photon activation analysis, fast neutrons are emitted as a by-product from the interaction of high-energy source photons with the materials used to construct the radiation source. For example, in the case that the photon source is an X-ray source using an electron accelerator and a Bremsstrahlung convertor target made from tungsten, X-rays above a threshold energy of 6.7 MeV will give rise to neutrons produced via (g,n) reactions on tungsten isotopes in the target. Neutrons produced in this way have energies ranging from keV to MeV, and these will be thermalised in the sample material in direct relation to the sample's moisture content.

Once the irradiation period is complete, the robot transfers the sample container 101 and reference disc 103 to the detector/measurement station 110. It is preferable that the sample transfer is effected automatically using for instance the robot, or a pneumatic or an electrical mechanism. However in the case that the half-lives of the sample element and reference element products are sufficiently long, the sample container 101 and reference disc 103 may be manually transferred to the detector and measurement station.

In the detector and measurement station 110, a first gamma-ray detector 111 is positioned adjacent to the side of the sample container to which the reference material 103 is affixed. Consequently, this first detector 111 can detect gamma-rays emitted from the reference element disc 103 without the gamma-rays having to first pass through the sample material and thereby suffer attenuation.

A second gamma-ray detector 112 is positioned on the side of the sample container opposing the reference material.

This second detector 112 is used to increase the efficiency with which gamma-rays emitted from the sample material may be detected.

A processor 113 to register and count the gamma-ray signals from the detectors is provided. The processor is operable to distinguish the energy of detected gamma-rays, allowing signals from activated elements in the sample material (activation signals) to be separated from signals from the reference element disc 103 (reference disc signals).

The sample container 101 containing the sample material is left in the detector and measurement station until sufficient time has elapsed for the activation signals and reference disc signals to be counted to a required level of precision. The sample container 101 containing the sample material may then be returned for a further cycle of activation and measurement or ejected from the detector/measurement system to permit a new sample to be analysed.

The signal from the reference element in the reference disc provides a direct measurement of the thermal neutron flux in the vicinity of the sample material during the irradiation period. This signal may be related back to the hydrogen content of the sample, and hence the moisture content of the sample material can be determined.

Figure 2:
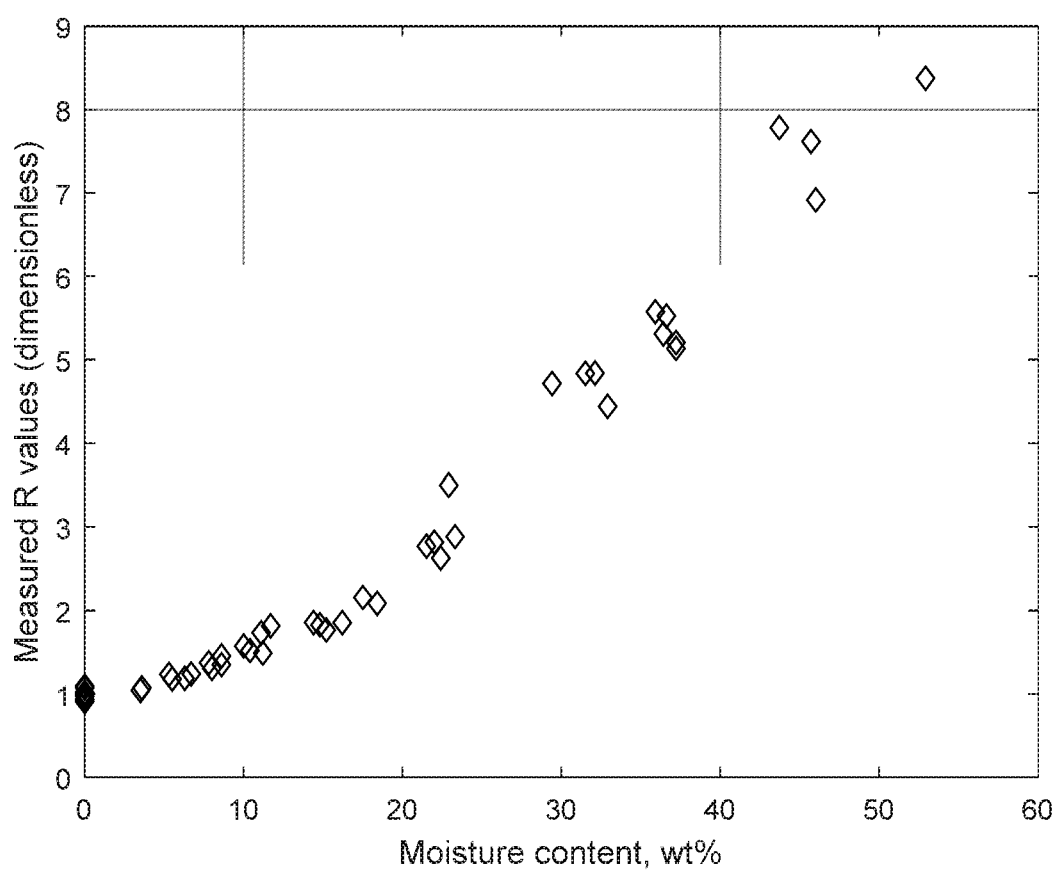
FIG. 2 is a graph showing experimentally measured scandium-to-bromine activation ratios for thirteen mineral ore samples each measured at four different moisture contents.
Figure 3:
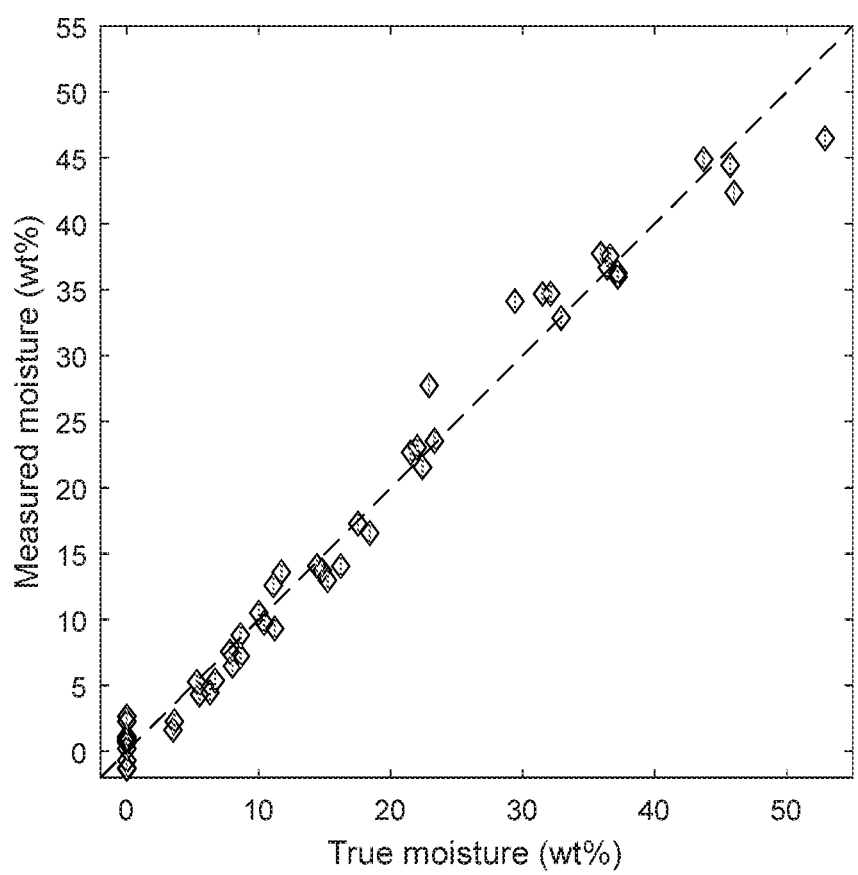
FIG. 3 is a graph showing the results for moisture measurement using the current invention plotted against the true moisture measurement for the thirteen mineral samples, each measured at the four different water contents.

FIG. 2 shows experimentally measured scandium-to-bromine activation ratios for thirteen mineral ore samples each measured at four different moisture contents. Linear regression can be used to fit these data with a curve having the functional form specified in equation (3) to determine the values of the parameters a and b. The results for the calibrated moisture determination are shown in FIG. 3. The repeatability of the moisture measurement is determined to be 0.8 wt % and the overall accuracy to be approximately 1.5 wt %.

An advantage of at least one embodiment of the invention is that the moisture content of a sample material is able to be determined in parallel with elemental activation analysis (assaying of a mineral sample using fast-neutron or photon activation analysis). This eliminates the need for additional detection equipment and further eliminates the need for an additional radiation source since the radiation source that is used for the elemental activation analysis doubles as the source for the neutron thermalisation measurements.

It should be appreciated to those skilled in the art, that sensitive activation analysis of low elemental concentrations involves a very intense radiation source. However a very intense radiation source could saturate, if not damage, an active neutron detector which is positioned in the vicinity of the sample during irradiation (as is the case in traditional neutron moisture meters using an electronic neutron detector). In embodiments of the invention thus described, the detector is able to be physically separated and shielded from the radiation emitted by the source hence removing the risk of damage to the detector.

In the illustrated embodiment, the sample container 101 has a recess in its top which has sufficient dimensions to accommodate reference disc 103. In an alternative configuration, the reference disc may take the form of a shallow dish comprised of a circular body portion having a perimeter wall, with the reference material contained generally in the body portion. With this configuration a face of the sample container may sit flush against the circular body and the entire sample material may be contained by the dish such that it does not extend above the perimeter wall. Optionally the sample container may extend above the perimeter wall. In either configuration the reference disc 103 and sample container 101 should be positioned in close proximity to one another to assist in their being irradiated and measured simultaneously.

Whilst in the illustrated embodiment the reference disc 103 is formed by embedding the reference element within a durable magnesium carrier, in alternative embodiments, the reference disc may be formed wholly from the reference element.

The description above refers to the measurement of the moisture content of mineral samples in parallel with the sample being assayed via gamma activation analysis (GAA). However, the invention is also applicable to the determination of moisture in samples being assayed via fast-neutron activation analysis. Fast-neutron activation analysis is complementary to gamma activation analysis and provides good sensitivity for light elements that cannot easily be determined using GAA.

Modifications and improvements to the invention will be readily apparent to those skilled in the art. Such modifications and improvements are intended to be within the scope of this invention. For instance, the positioning of the source and sample container are not limited to the described embodiment. In alternative embodiments the source may be positioned above or below the sample container. In a still alternative embodiment the source may substantially surround the sample container. Further, whilst the illustrated embodiment uses a pair of detectors in alternative embodiments a single detector is able to be used, as long as it is positioned on the same side of the sample container as the reference disc.

The invention claimed is:

1. A method of determining the moisture content in a sample material while the sample material is undergoing elemental activation analysis (EAA) to determine the concentration of at least one sample element contained in the sample material which during EAA forms an activation product, the method comprising:
    positioning a reference material in vicinity of the sample material, the reference material containing a reference element having a thermal neutron capture cross-section of at least 1 barn, the reference element selected such that its product isotope of a thermal neutron capture reaction is a radioisotope that emits gamma-rays;
    irradiating the sample material and the reference material with a source of fast neutrons to produce thermal neutrons in the sample material;
    detecting gamma-rays emitted from the reference material and generating signals representative of the detected gamma-rays;
    calculating a factor, R, proportional to the thermal neutron flux based on the generated signals; and
    determining, from a relationship relating moisture content to R, the moisture content in the sample material,
    wherein the reference element is distinct from the at least one sample element in the sample material.

2. A method according to claim 1, further comprising selecting the reference element such that both the product isotope formed by neutron capture and the activation product of the sample element have a half-life in a range of 1 second to 10 minutes.

3. A method according to claim 2, further comprising selecting the reference element such that the gamma-rays emitted by the product isotope have an energy that does not interfere with gamma-rays emitted by the sample element.

4. A method according to claim 2, further comprising selecting the reference element such that, if it is present in the sample material, then its concentration in the sample material is relatively insignificant.

5. A method according to claim 4, where the mass of the reference element present in the sample material is less than 2% of the mass of the reference element in the reference material.

6. A method according to claim 4, where the mass of the reference element present in the sample material is less than 0.5% of the mass of the reference element in the reference material.

7. A method according to claim 1, further comprising selecting the reference element such that its product isotope is formed from a target isotope of the reference element, wherein the natural abundance of the target isotope is greater than 1%.

8. A method according to claim 1, further comprising selecting the reference element such that the reference element is not prone to an interfering reaction, whereby the product isotope is formed via reactions with other naturally occurring isotopes of the reference element, other than thermal neutron capture.

9. A method according to claim 1, where R is calculated by:
counting the generated signals over a period of time ($t_m$); and
determining a measured area of the gamma-peak associated with the reference element ($N_{\gamma 1}$);
determining a timing factor $T_1$, where $$T_1 = \frac{1}{r_1}\left(1 - e^{(-r_1 t_i)}\right) \cdot \left(e^{(-r_1 t_c)}\right) \cdot \left(1 - e^{(-r_1 t_m)}\right);$$

and
calculating R, where $$R = \frac{N_{\gamma 1}}{T_1},$$

where $t_i$ and $t_c$ are respectively the irradiation and cooling times used for the elemental activation analysis, and where $r_1 = \log(2)/\text{thalf}_1$, where $\text{thalf}_1$ is the half-life of the product isotope.

10. A method according to claim 1, where the relationship is an empirical relationship, and where the method further comprises determining the empirical relationship relating moisture content to R by calculating R for a plurality of sample materials of different moisture contents.

11. A method according to claim 9, further comprising selecting the quantity of the reference element such that it produces a gamma-ray spectral peak of at least 1,000 counts.

12. A method according to claim 1, where the sample element is one of gold and silver and/or the reference element selected is scandium.

13. A method according to claim 1, where the reference material contains a second reference element and the method further comprising selecting the second reference element such that its product isotope of a thermal neutron capture reaction is a radioisotope that emits gamma-rays having a different energy from the gamma-rays emitted by the radioisotope associated with the first reference element.

14. A method according to claim 13, further comprising selecting the second reference element such that both the product isotope associated with the second reference element and the product isotope associated with the first reference element have a half-life in a range of 1 second to 10 minutes.

15. A method according to claim 13, where the sample element selected is gold or silver, the reference element selected is scandium, and the second reference element selected is bromine.

16. A method according to claim 1, wherein the method is performed using a system, the system comprising:
a source of fast neutrons configured to irradiate a sample material and a reference material to produce thermal neutrons in the sample material, wherein the system is adapted for the reference material to be positioned in vicinity of the sample material, the reference material containing a reference element distinct from the at least one sample element and having a thermal neutron capture cross-section of at least 1 barn, the reference material being selected such that its product isotope of a thermal neutron capture reaction is a radioisotope that emits gamma-rays;
a detector and measurement station that is physically separate from the source of fast neutrons, the detector and measurement station comprising:
at least a first detector configured to (i) detect gamma-rays emitted from the reference material and (ii) to generate signals representative of the detected gamma-rays; and
a processor coupled to the detector and configured to calculate a factor proportional to the thermal neutron flux, R, based on the generated signals and to identify, from a relationship relating moisture content to R, the moisture content in the sample material.

17. A method according to claim 16, wherein the source of fast neutrons is either a neutron-emitting isotopic source, a sealed-tube neutron generator, a particle accelerator, or an X-ray source producing photo-neutrons.

18. A method according to claim 16, wherein the processor is further configured to determine the empirical relationship relating moisture content to R by calculating R for a plurality of sample materials of different moisture contents.

19. A method according to claim 16, wherein the system further comprises a container configured to contain the sample material, wherein the system is configured for the reference material to be positioned in close proximity to the sample container such that, in use, the first detector is positioned adjacent an outer face of the reference material.

20. A method according to claim 18, wherein the system further comprises an energy resolving detector which in use is configurable adjacent an outer face of the sample material.

\* \* \* \* \*